United States Patent [19]
Kaneko et al.

[11] 3,969,994
[45] July 20, 1976

[54] APPARATUS FOR FORMING RING-SHAPED FOODSTUFFS

[76] Inventors: Ryutaro Kaneko; Yoshio Kaneko, both of 8, Sanno-cho 1-chome, Minami, Yokohama, Kanagawa, Japan

[22] Filed: July 11, 1975

[21] Appl. No.: 595,309

[52] U.S. Cl. .............................. 99/450.6; 141/105
[51] Int. Cl.² ..................................... A21C 9/06
[58] Field of Search ........... 141/100, 102, 104, 105; 99/450.6, 450.7, 450.1

[56] References Cited
UNITED STATES PATENTS

| | | | |
|---|---|---|---|
| 1,276,006 | 8/1918 | Bausman | 99/450.6 |
| 2,642,010 | 6/1953 | Zimmer | 99/450.6 |
| 3,532,510 | 10/1970 | Zimmerman | 99/450.6 |

*Primary Examiner*—Robert I. Smith
*Attorney, Agent, or Firm*—Wenderoth, Lind & Ponack

[57] ABSTRACT

In an apparatus for forming ring-shaped foodstuffs having annular fillings therein, a plurality of forming units are juxtaposed side by side and each comprises concentrical cylinders defining an annular space therebetween for an enclosure material and a cylindrical space inside of the inner cylinder for a filling material and operative parts for discharging the enclosure material and the filling material at predetermined relationships. The plural forming units are connected to a hopper for the enclosure material and another hopper for the filling material, and the operative parts in each of the units are simultaneously operated by a driving mechanism, in which a plate for receiving formed foodstuffs extends in the traverse direction of the units, the plate moving down after receiving the formed foodstuffs and rotating about 180 degrees to drop the foodstuffs on a fryer or a conveyer below the units.

6 Claims, 16 Drawing Figures

APPARATUS FOR FORMING RING-SHAPED FOODSTUFFS

This invention relates to an apparatus for forming ring-shaped foodstuffs and more particularly to an automatic forming apparatus for ring-shaped foodstuffs in which an annular filling such as bean-paste, cream, jam, paste-meat or cheese is enclosed in an edible enclosure material such as dough, mash-potato or paste-meat.

Applicants of the present invention have ever provided an automatic molding apparatus for ring-shaped doughnuts enclosing fillings as shown in U.S. Pat. No. 3,452,687. However, in order to form a great number of doughnuts within a predetermined short period of time, it has been required to arrange a plurality of such apparatus side by side, occupying a large area for installation. In addition, it has been very difficult to accurately synchronize the various movements of all of the apparatus juxtaposed for bulk production of the doughnuts, so that time period consumed for frying the doughnuts in the same fryer differs among them, thereby causing undesirable deformity in the doughnuts.

Further, perishable the apparatus of this kind are used for forming prishable foodstuffs, it is desired that the formed foodstuffs be directly dropped on a conveyor continuously running below the plurality of juxtaposed apparatus and carried into a freezing chamber. However, when these apparatus are not synchronized for forming the foodstuffs, the formed foodstuffs cannot be placed on the conveyer at predetermined intervals or will be lain against the other ones and integrally connected with each other.

Accordingly, an object of the present invention is to provide an apparatus suited for bulk production of ring-shaped foodstuffs enclosing annular fillings therein.

Another object of the present invention is to provide an apparatus which synchronize various movements of a plurality of juxtaposed units for forming ring-shaped foodstuffs.

A further object of the present invention is to provide an apparatus suited for forming foodstuffs which are to be carried in a freezing chamber by a conveyor continuously running below a plurality of juxtaposed forming units.

A still another object of the present invention is to provide an apparatus which is simple in structure and reliably synchronizes various movements of the plurality of juxtaposed forming units of the ring-shaped foodstuffs.

Other objects and features of the present invention will become apparent from the detailed description of the preferred embodiments thereof, which will be read with reference to the accompanying drawings, in which.

Figure 8A:
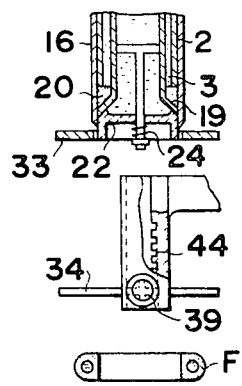
Figure 8B:
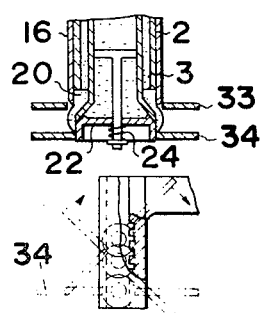
Figure 8C:
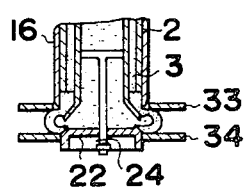
Figure 8D:
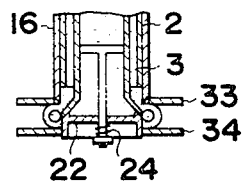
Figure 8E:
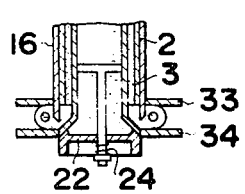
Figure 8F:
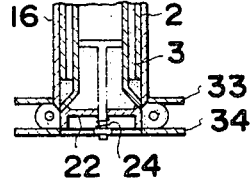
Figure 8G:
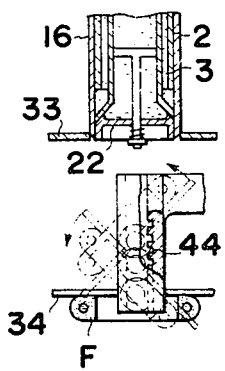
Figure 9A:
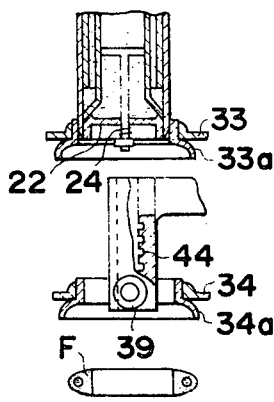
Figure 9E:
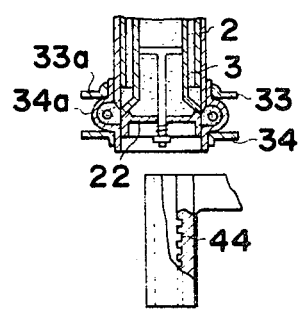

FIGS. 8a—8g are explanatory views showing a process for forming ring-shaped foodstuffs in turn embodying the invention; and FIGS. 9a and 9e are explanatory views showing another process for forming ring-shaped foodstuffs embodying the invention, wherein the operative positions herein correspond to those in FIGS. 8a and 9e, respectively.

Figure 1:
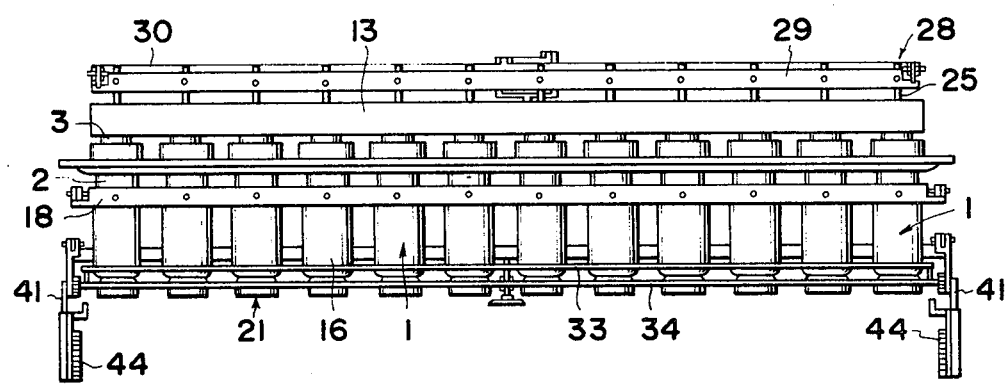
FIG. 1 is a front view of an apparatus embodying the present invention.
Figure 2:
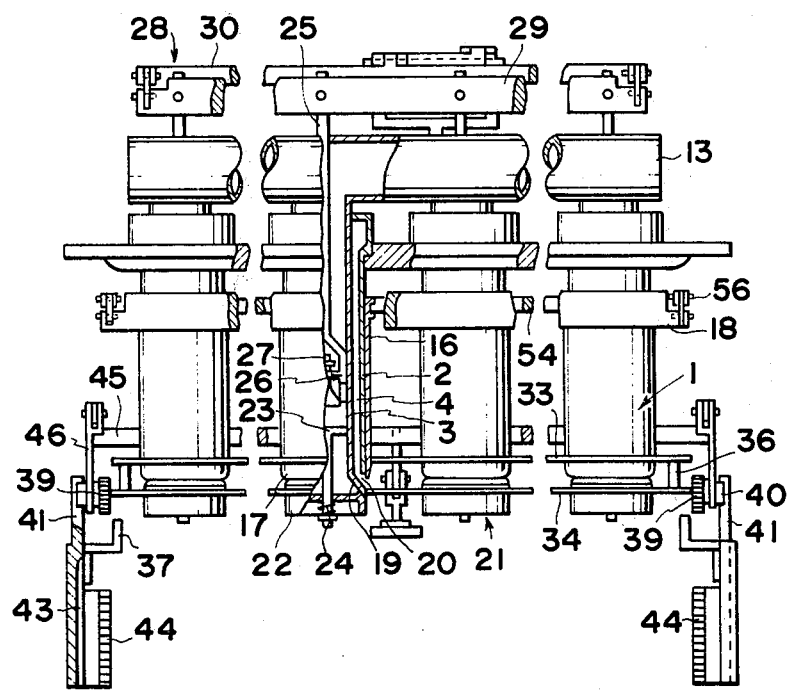
FIG. 2 is a partly fragmented front view of a part of the apparatus embodying the invention.

Referring to FIGS. 1 through 5, a series of units 1 for forming ring-shaped foodstuffs such as doughnuts are juxtaposed along a machine frame and spaced from each other. As shown in FIG. 2, each of the units 1 comprises an enclosure material outlet pipe 2 and a filling outlet pipe 3 concentrically positioned within the material outlet pipe so that an annular space is formed therebetween to provide a passage for the enclosure material, while the cylindrical space within the filling outlet pipe forms a passage for the filling material. Hoppers 5 and 6 are provided at the back and intermediate of the series of the units for storing the enclosure material and the filling material, respectively. The enclosure material in the hopper 5 is fed into the annular space between the pipes 3 and 4 by an enclosure material delivery means 7 shown in FIGS. 3 and 5. Likewise, the filling material in the hopper 6 is fed into the cylindrical space in the pipe 3 by a filling material delivery means 8.

The enclosure material delivery means 7 comprises a distribution pipe 9 extending along the series of the units, branched pipes 10 each of which connects the upper end of the outlet pipe 2 with the distribution pipe 9, a pumping device 11 disposed adjacent to the lower end of the hopper 5, and a delivery pipe 12 which connects the pumping device 11 with the distribution pipe 9. Accordingly, when the pumping device 11 is operated, the enclosure material in the hopper 5 is fed to each of the annular space between the pipes 2 and 3 through the distribution pipe 9 and the branched pipes 10.

The filling delivery means 8 comprises filling distribution pipe 13 having branched pipes opened to the upper ends of the filling outlet pipes 3, a pumping device 14 disposed adjacent to the lower end of the filling hopper 6, and a filling delivery pipe 15 which connects the pumping device 14 with the filling distribution pipe 13. Accordingly, when the pumping device 14 is operated, the filling material in the hopper 6 is fed to each of the cylindrical space in the pipe 3 through the distribution pipe 13 and the branched pipes.

Each of the units 1 for forming the ring-shaped foodstuffs further comprises a cylindrical sleeve 16 fitted to the outer circumferential surface of the enclosure material outlet pipe 2 to be slidable up and down, as shown in FIG. 2. The sleeve 15 has a blade edge 17 at the lower end thereof and is connected to other sleeves 16 by a coupling member 18 provided at the upper portion of the sleeve and extending along the series of the units 1.

The filling outlet pipe 3 has a flared flange 19 at the lower end portion thereof, which terminates with a diameter equal to the outside diameter of the enclosure material outlet pipe 2. The flared flange 19 is spaced from the lower end of the outlet pipe 2, thereby forming a enclosure material outlet port 20.

Below the flared flange 19 is provided a means 21 for forming an annular filling outlet port. This means 21 comprises an inverted cup-shaped cylindrical member 22 having bladed edge at the upper circumference thereof, the outer diameter of which is equal to that of the flared flange 19. The cylindrical member 22 is supported by a shaft 23 connected to the inner surface of the filling outlet pipe 3 by raidal arms and is urged against the flared flange 19 by a compression spring 24 provided between the cylindrical member 22 and the enlarged lower end of the shaft 23.

Figure 5:
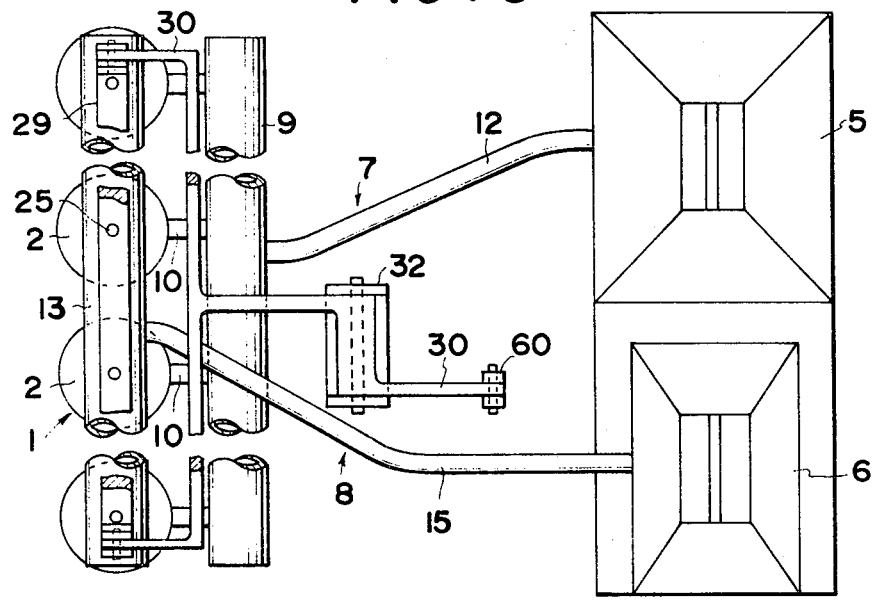

Also provided in the filling outlet pipe 3 is a piston assembly 26 connected to the lower end of a piston rod 25. The piston assembly comprises a one-way valve 27 which closes to push out the filling when the piston rod 25 advnces or moves down but opens to allow the filling to pass therethrough when the piston rod 25 retreats or moves up. The piston rods 25 each extending upwardly through the filling outlet pipe 3 are connected to each other by a coupling plate 29 and driven simultaneously by a driving mechanism 28 shown in FIG. 3. The driving mechanism 28 comprises a lever 30 pivoted at the intermediate portion thereof to a fixed arm 32 on the machine frame by a pin 31. The lever 30 is bifurcated at the front end portion thereof, to which both ends of the coupling plate 29 are pivoted as shown in FIG. 5.

Figure 3:
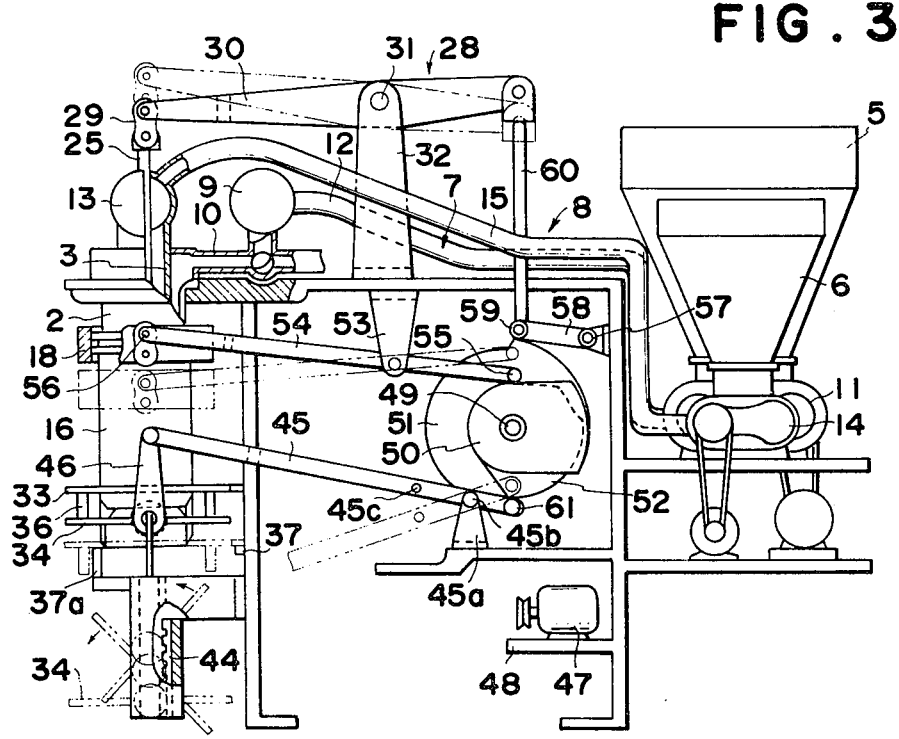
FIG. 3 is a partly fragmented side view of a part of the apparatus embodying the invention.

In such a manner as to sandwich the enclosure material outlet port 20, there are provided a product separating plate 33 and a product receiving plate 34, each of which extends in the traverse direction of the units. The product separating plate 33 is slender and long enough to reach from end to end of the series of the units, and has a series of circular openings into which the cylindrical sleeves 16 can be snugly and slidably fitted. The product separating plate 33 also has spacer members 36 attached to the bottom surface thereof at both ends thereof to maintain a predetermined space between the two plates 33 and 34. While the foodstuffs are formed by the units 1, the product separating plate 33 is placed on the product receiving plate 34 with the above-mentioned predetermined space. However, when the product receiving plate 34 moves down after formation of the foodstuffs, the product separating plate 33 slides down, by the weight thereof or by a spring force (not shown), along with the downward movement of the product receiving plate 34, but is restricted from sliding down as it collides against stopper members 37 provided at both ends of the machine frame and stopper arms 37a projecting upwardly from the machine frame, thereby taking a lowered position close to the lower level of the bladed cylindrical members 22, as shown in FIG. 3.

Figure 7:
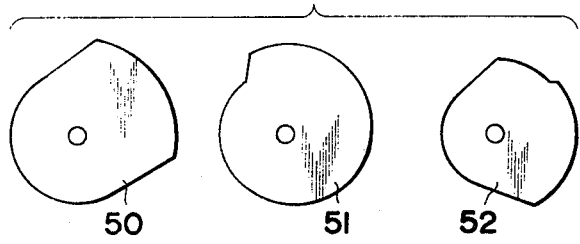
FIG. 7 is a fragmented perspective view showing a device for rotating a product separating plate used in the present apparatus.

The product receiving plate 34 has a series of circular openings 38 into which the bladed cylindrical members 22 are snugly and slidably fitted. The plate 34 also has toothed wheels 39 fixed at both ends thereof by bosses 40, each of which has a vertical grooves 42 to be engaged with each of guide plates 41 vertically provided on the machine frame adjacent to the both ends of the plate 34, as shown in FIG. 7. The product receiving plate 34 is narrow enough not to collide against the stopper members 37 on the machine frame and has a slot at each ends thereof by which the plate 34 can move down without colliding against the stopper arms 37a. When the product receiving plate 34 moves down, the grooves 42 in the bosses 40 engage with the vertical guide plates 41, so that the subsequent downward movement of the plate 34 is guided until the plate 34 comes down beyond the lower end of the bladed cylindrical member 22.

At the time when the plate 34 comes down beyond the lower end of the bladed cylindrical member 22, the bosses 40 of the toothed wheels 39 are disengaged from the guide plates 41 and reach recessed portions 43 in the guide plate, where the product receiving plate 34 becomes rotatable about the longitudinal center line of the plate 34. When the product receiving plate 34 further moves down, the toothed wheels 39 at both ends of the plate 34 mesh with racks 44 provided adjacent to the recessed portion 43 in the guide plates, as shown in FIG. 2.

Figure 4:
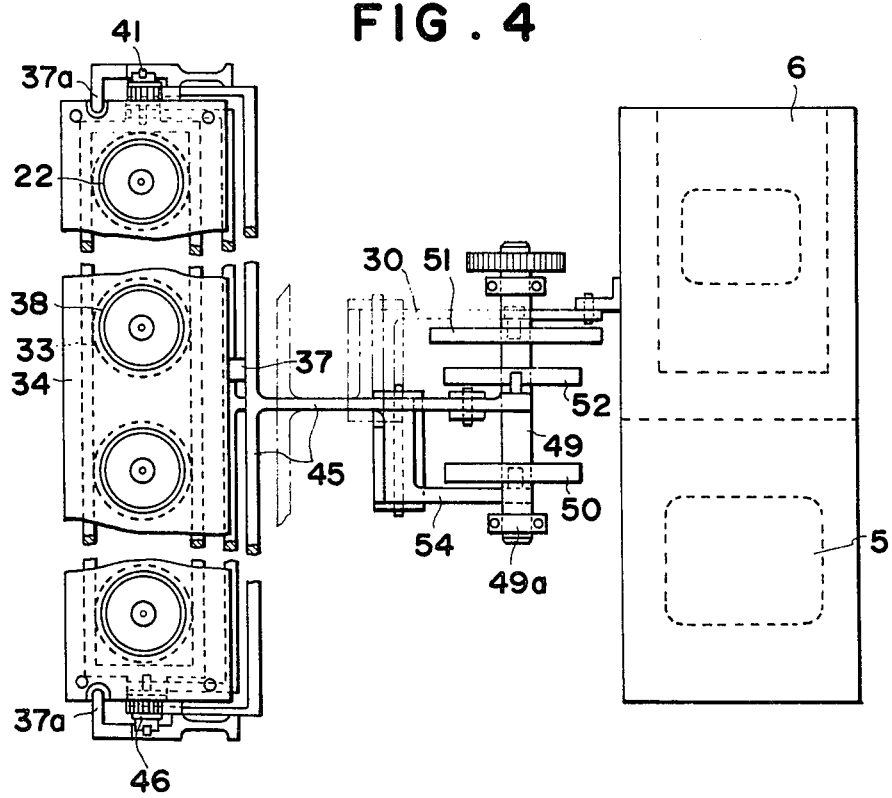
FIGS. 4 and 5 are a bottom plan view and a top plan view, respectively, of the apparatus shown in FIG. 3.

The downward and upward movements of the product receiving plate 34 is performed by an operation lever 45 and two connecting levers 46. As shown in FIGS. 3 and 4, the operation lever 45 bifurcated toward the front end is pivoted to a supporting member 45a on the machine frame by a pin 45b provided at the rear portion of the lever 45, and is swung up and down about the pin 45b by a grooved cam 52 engaged with the rear end of the lever 45. The connecting levers 46 are pivotally connected at their upper ends to the bifurcated front ends of the operation lever 45 and rotatably connected at their lower end holes with the bosses 40 on both sides of the product receiving plate 34.

Figure 6:
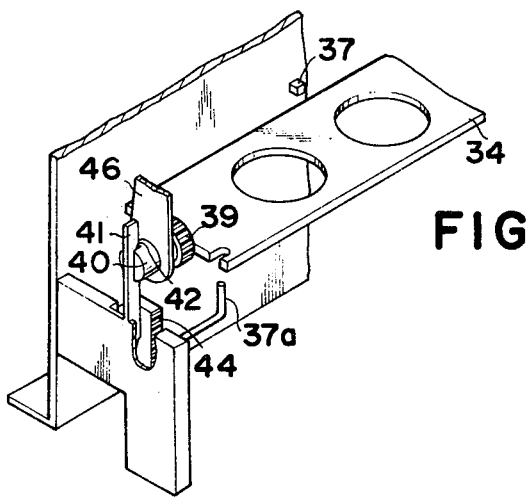
FIG. 6 is a front view of three cams used in an embodiment of the present invention.

Reference is now made to cams and link assembly for operating, in predetermined time relationships, the pistons 26 for feeding the filling materials, sleeves 16, and the product receiving plate 34. A motor 45 for operating these elements is disposed on a supporting plate 48 in the machine frame as shown in FIG. 3 and is operatively connected with a main shaft 49 to rotate the latter in bearings 49a shown in FIG. 4. The main shaft 49 has three grooved cams 50, 51 and 52 fixed thereon, in which the cams 50, 51 and 52 having such profiles as shown in FIG. 6 function to operate the sleeve 16, the piston 26, and the product receiving plate 34, respectively. Although omitted in the drawings, the connections between the cams 50–52 and the main shaft 49 are made by using known clutch mechanism.

As shown in FIG. 3, the cam 50 for moving the sleeves up and down is engaged with a roller 55 at the rear end of a lever 54, which is pivotably connected to a supporting arm 53 on the machine frame at the intermediate portion thereof. The lever 54 is bifurcated toward the front ends, to which the both ends of the coupling member 18 of the sleeves are pivotably connected at points 56.

The cam 51 for reciprocal movements of the piston assemblies 26 is engaged with a roller 59 at the front end of the lever 58, which is pivotably connected to a supporting arm 57 on the machine frame at the rear end thereof. The lever 58 is also pivoted at the front end thereof to the lower end of a connecting rod 60, which in turn is pivoted at the upper end thereof to the rear end of the lever 30 for operating the piston rods 25 as well as the piston assemblies 26.

The cam 52 for moving the product receiving plate 34 up and down is engaged with a roller 61 at the rear end of the lever 45 which is pivoted at the supporting member 45a by the pin 45b. The connection between the lever 45 and the product receiving plate 34 is made by the connecting levers 46.

Due to the rotations of the cams 50–52 and the associated movements of the levers and links, a process for forming the ring-shaped foodstuffs is automatically and repeatedly carried out in predetermined time relationships, such as the discharge of the filling material by the reciprocal movements of the piston assemblies 26, the discharge of the enclosure material and the cutting of the discharged enclosure material by the up-and-down movements of the sleeves 16, the up-and-down movements of the product separating plate 33 and the product receiving plate 34, and the downward movement and rotation of the product receiving plate 34.

Reference is now made in detail to a process for forming the ring-shaped foodstuffs in the present apparatus with reference to FIGS. 8a–8g which show various operative positions of a single unit.

The enclosure material prepared as desired and stored in the hopper 5 is fed into the annular spaces formed between each of the outlet pipes 3 and 4 of the units by way of the pumping device 11, distribution pipe 9 and the branched pipes 10. On the other hand, the filling material in the hopper 6 is fed into each of the filling outlet pipes 3 by way of the pumping device 14, distribution pipe 13 and the branched pipes.

Thereafter, when the motor 47 is driven to rotate the main shaft 49 as well as the grooved cams 50–52 at a predetermined speed from a position, for example, shown in FIG. 8(a), where the sleeve 16 is at the lowest position and closes the enclosure material outlet port 20 and the product receiving plate 34 is also at the lowest position and takes a reversely rotated position to drop the ring-shaped foodstuffs, the product receiving plate 34 starts elevating. While the product receiving plate 34 elevates, it rotates in the clockwise direction as shown by dots-and-dash lines and arrows in FIG. 8b, since the toothed wheels 39 at both ends of the product receiving plate engage with the racks 44. At the time when the elevated product receiving plate 34 is rotated as much as 180° from the position shown in FIG. 8a, the engagement between the toothed wheel 39 and the rack 44 is released. Then, the groove 42 provided in the end surface of each of the bosses is engaged with the vertical guide plate 41, whereby the product receiving plate 34 moves up without rotating and, in the course of the upward movement, lifts the product separating plate 33 by means of the spacer members 36. The both plates 33 and 34 stop elevating at the upper position and sandwich the lower portion of the enclosure material discharge port 20 to be opened subsequently. Then, the sleeve 16 moves up to open the port 20 and to annularly discharge the enclosure material threrethrough, as shown in FIG. 8b. Thereafter, the piston assembly 26 moves down to press the filling material thereunder, so that due to the pressure applied to the filling material, the bladed cylindrical member is lowered against the spring 24 to open the filling material outlet port. Accordingly, the filling material is discharged inside of the enclosure material to, thereby, forcibly swell the enclosure material, as shown in FIG. 8c. The swelled enclosure material having the filling material therein is confined between the product separating plate and the product receiving plate 34. Subsequently, when the piston assembly 26 moves up, the bladed cylindrical member 22 returns to the closing position by the action of the spring 24, whereby the cutting of the discharged filling material and the closing of the filling discharge ports are performed simultaneously, as shown in FIG. 8d.

Subsequently, the product receiving plate 34 moves up to a level just below the enclosure material outlet port 20 together with the product separating plate 33 placed on the plate 34 with the spacer members therebetween, so that the inner peripheral surface of the filling material is covered by the successively discharged enclosure material, as shown in FIG. 8e.

Then, following to the downward movements of the plates 33 and 34, the sleeve 16 lowers to close the enclosure material outlet port 20, as shown in FIG. 8f. After closing the port 20, the sleeve 16 as well as the product separating and receiving plates 33 and 34 further lower to a level where the lower end of the sleeve 16 is on the same horizontal level as the lower end of the bladed cylindrical member 22. At this level, the sleeve 16 stops lowering and the product separating plate 33 collides against the stoppers 37 and 37a and stops lowering. However, the product receiving plate 34, on which the formed foodstuffs are placed, continuously lowers and, in the course of the lowering movement, the plate 34 rotates in the counterclockwise direction up to 180 degrees as shown by arrows in FIG. 8g due to the engagement of the toothed gears 39 with the racks 44, whereby the foodstuffs (F) are dropped under the plate 34. When the foodstuffs (F) are cake doughnuts for example, a fryer is provided under the plate 34 to fry the foodstuffs in the heated oil therein. Alternatively, when the foodstuffs are yeast doughnuts or when the enclosure materials for the foodstuffs are paste-meats or mash-potatos, a continuously running conveyor is provided under the plate 34 for carrying the formed foodstuffs in an oven or a freezing chamber.

After the formed foodstuffs are dropped by the plate 34, the apparatus takes the position shown in FIG. 8b and repeatedly forms the foodstuffs along the process set forth above.

In the operational explanation set forth above with reference to FIG. 8, only a single unit 1 of the present apparatus is referred. However, as shown in FIG. 1, since a plurality of such units are juxtaposed in the present apparatus to have the same operational movements by the single driving means, a plurality of the foodstuffs are simultaneously formed from each of the units in the process shown in FIGS. 8a–8g.

Shown in FIGS. 9a and 9e is another embodiment of the present invention in which molding cups 33a and 34a are provided in each circular openings in the product separating plate 33 and the product receiving plate 34, respectively. The operational positions shown in FIGS. 9a and 9e correspond those shown in FIGS. 8a and 8e. The molding cups 33a and 34a have such a shape as to form an annular wall when they are closed as shown in FIG. 9e. The molding cups of such type are used when the enclosure material for the foodstuffs are soft. The shape of the molding cups may be varied in order to form desired external configuration of the foodstuffs. Even when the molding cups are used, the process for forming the ring-shaped foodstuffs are substantially same as that disclosed with reference to FIGS. 8a–8g. Accordingly, a detailed explanation of the process is omitted here.

Although it is not shown in the drawings, when the enclosure material for the ring-shaped foodstuffs is relatively hard, it will be possible to form the foodstuffs without using the product separating plate 33.

Further, in place of the cylindrical member 22 provided below the filling outlet pipe 3, a substantially circular plate member may be provided In such a case, the product receiving plate 34 without a series circular openings may be used, because the plate 34 can take a position closely adjacent to the filling outlet port.

Other modification and alterations may be made within the spirit of the present invention.

What is claimed is:

1. In an apparatus for forming ring-shaped foodstuffs having annular fillings therein, said apparatus comprising:
    a plurality of forming units disposed side by side, each unit comprising an outer pipe, and inner pipe concentrically disposed within said outer pipe with an annular space therebetween, the lower end of said inner pipe extending beyond the lower end of said outer pipe to define a first outlet post of an enclosure material of the foodstuffs, a cylindrical sleeve slidably mounted on the outer circumferential surface of said outer pipe to have a lowered position closing said first outlet port and an elevated position opening said first outlet port, a member urged against the lower open end of said inner pipe to normally close said open end, a piston assembly adapted for pushing a filling material in said inner pipe downwardly against the urging force of said member to form a second outlet port for said filling material between the lower end of said inner pipe and said urged member;
    a first hopper for storing the enclosure material of the foodstuffs;
    a second hopper for storing the filling material of the foodstuffs;
    a first pipe means for feeding said enclosure material in said first hopper into the annular space between the inner and outer pipes in each of said units;
    a second pipe means for feeding said filling material in said second hopper into said inner pipe in each of said units;
    a means for simultaneously operating all of the cylindrical sleeves in said units;
    a means for simultaneously operating all of the piston assemblies in said units; a product receiving plate extending in the transverse direction of the plural units;
    a means for moving said product receiving plate from the upper position adjacent to said second outlet port in each of said units to a lower position spaced away from the lower end of each of said units;
    a means for rotating said product receiving plate about 180 degrees while said plate moves down from the lower ends of said units; and
    means for driving said cylindrical sleeves operating means, said piston assemblies operating means, and said product receiving plate rotating means in predetermined time relationships.

2. An apparatus as claimed in claim 1, further comprising:
    a product separating plate extending in the transverse direction of plural units and having a plurality of circular openings fitted to the lower end portions of said units;
    a means for spacing said product separating plate above said product receiving plate adapted to sandwich at least a part of said first outlet port and said second outlet port between said both plates while said product receiving plate is at the upper position; and
    a means for keeping said product separating plate at the lower ends of said units while said product receiving plate rotates by the downward movement thereof.

3. An apparatus as claimed in claim 1, wherein said member biased against the lower open end of said inner pipe is a cylindrical member having a circular blade edge at the upper circumference thereof; and said product receiving plate has a plurality of circular opening snugly and slidably fitted to each of said cylindrical member.

4. An apparatus as claimed in claim 1, wherein said means for rotating the product receiving plate comprises toothed wheels fixed to both ends of said plate and racks to be engaged with said toothed wheels when said plate moves down.

5. An apparatus as claimed in claim 2, wherein said spacing means comprises spacer plates attached to the bottom surface of said product separating plate at both ends thereof, said spacer plates contacting at their lower ends to the upper surface of said product receiving plate; and said keeping means is a plurality of stopper members against which said product separating plate collides while the latter moves down and stops lowering.

6. An apparatus as claimed in claim 3, further comprising molding cups provided in each of said circular openings in said product separating and receiving plates, said molding cups forming annular walls around a part of said first outlet ports and said second outlet ports when said product receiving plate is at the upper position.

* * * * *